United States Patent
Miller et al.

(10) Patent No.: US 9,182,978 B2
(45) Date of Patent: Nov. 10, 2015

(54) APPLICATION CONFIGURATION USING BINARY LARGE OBJECTS

(71) Applicant: Microsoft Corporation, Redmond, WA (US)

(72) Inventors: Michael Alyn Miller, Redlands, CA (US); Christopher Lane Boedigheimer, Redmond, WA (US); David James Whiteford, Redmond, WA (US); Ashok Chandrasekaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 354 days.

(21) Appl. No.: 13/712,984

(22) Filed: Dec. 13, 2012

(65) Prior Publication Data
US 2013/0232246 A1 Sep. 5, 2013

Related U.S. Application Data

(60) Provisional application No. 61/606,731, filed on Mar. 5, 2012.

(51) Int. Cl.
*G06F 15/177* (2006.01)
*G06F 9/44* (2006.01)
*G06F 9/445* (2006.01)

(52) U.S. Cl.
CPC .............. *G06F 8/71* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 6,052,512 A * | 4/2000 | Peterson et al. | 709/220 |
| 7,519,600 B1 * | 4/2009 | Zenz | 1/1 |
| 8,200,552 B2 * | 6/2012 | Swanson | 705/27.1 |
| 2001/0044339 A1 | 11/2001 | Cordero et al. | |
| 2003/0058238 A1 * | 3/2003 | Doak et al. | 345/419 |
| 2008/0227548 A1 | 9/2008 | Choudhry et al. | |
| 2008/0242421 A1 | 10/2008 | Geisner et al. | |
| 2008/0268947 A1 | 10/2008 | Fyock et al. | |
| 2009/0138421 A1 * | 5/2009 | Ansari et al. | 706/25 |
| 2009/0287746 A1 * | 11/2009 | Brown | 707/203 |
| 2010/0063854 A1 | 3/2010 | Purvis et al. | |
| 2010/0113160 A1 | 5/2010 | Belz et al. | |
| 2011/0136577 A1 | 6/2011 | Dietz et al. | |
| 2013/0339425 A1 * | 12/2013 | Carion et al. | 709/203 |

OTHER PUBLICATIONS

Zou, et al., "An Evaluation of Grouping Techniques for State Dissemination in Networked Multi-User Games", Retrieved at <<http://eeexploreieee.org/stamp/stamp.jsp?tp=&arnumber=948851>>, Proceedings of ninth international symposium on modeling, analysis and simulation of computer and telecommunication systems, Aug. 15, 2001, pp. 33-40.

* cited by examiner

*Primary Examiner* — Brian P Whipple
(74) *Attorney, Agent, or Firm* — Aaron C. Chatterjee; Kate Drakos; Micky Minhas

(57) ABSTRACT

Embodiments provide rule-based application configuration using a network service. A configuration parameter associated with an application includes a rule that specifies configuration data based on one or more criteria, such as by selecting a configuration value from a plurality of available configuration values. A request for configuration data corresponding to the configuration parameter is received from a client. The request includes one or more criteria describing a user associated with the client. Customized configuration data is determined based on the rule and the criteria of the request, and the customized configuration data is provided to the client. The client executes the application (e.g., a game) based on the customized configuration data.

20 Claims, 3 Drawing Sheets

APPLICATION CONFIGURATION USING BINARY LARGE OBJECTS

CROSS-REFERENCE TO RELATED APPLICATION

This application claims the benefit of U.S. Provisional Application No. 61/606,731, filed Mar. 5, 2012, which is incorporated herein by reference in its entirety.

BACKGROUND

Some games and applications (hereinafter referred to as "applications") use configuration data to perform functions. Configuration data for an application includes, for example, the difficulty of an enemy character in the game, the number of levels in a maze, and/or the reward provided to a player for completing an action. Some applications also use configuration data to send different data (e.g., images or text strings) to the user based on the native language of the user and/or the location from which the user is accessing the application.

In some existing systems, the application manages the configuration data. The application includes logic for selecting from among the possible values, determining which values are relevant for the current user, and displaying only those values to the user. For a different user interacting with the same application, a completely different set of values may be appropriate. The application is responsible for distinguishing between what data is appropriate for one user, and what data is appropriate for another. To modify the logic used to select configuration values, the provider of the application modifies application code, creates an application update based on the modified code, and publishes the application update. The modification becomes effective for each client only when the application update is installed at the client.

SUMMARY

Embodiments of the disclosure enable application configuration using rules. A configuration parameter associated with an application includes a rule that specifies configuration data based on one or more criteria, such as by selecting a configuration value from a plurality of available configuration values. In some embodiments, each available configuration value corresponds to a portion of the plurality of users.

A request for configuration data corresponding to the configuration parameter is received from a client. The request includes one or more criteria describing a user associated with the client. Customized configuration data is determined based on the rule and the criteria of the request, and the customized configuration data is provided to the client. The client executes the application based on the provided, customized configuration data.

A request from a second client specifying different criteria may be received, and different customized configuration data may be provided to the second client based on the same rule. The first client and second client execute the same application using the different configuration data and create application result data. The application result data may be compared, and the configuration parameter may be modified based on the comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
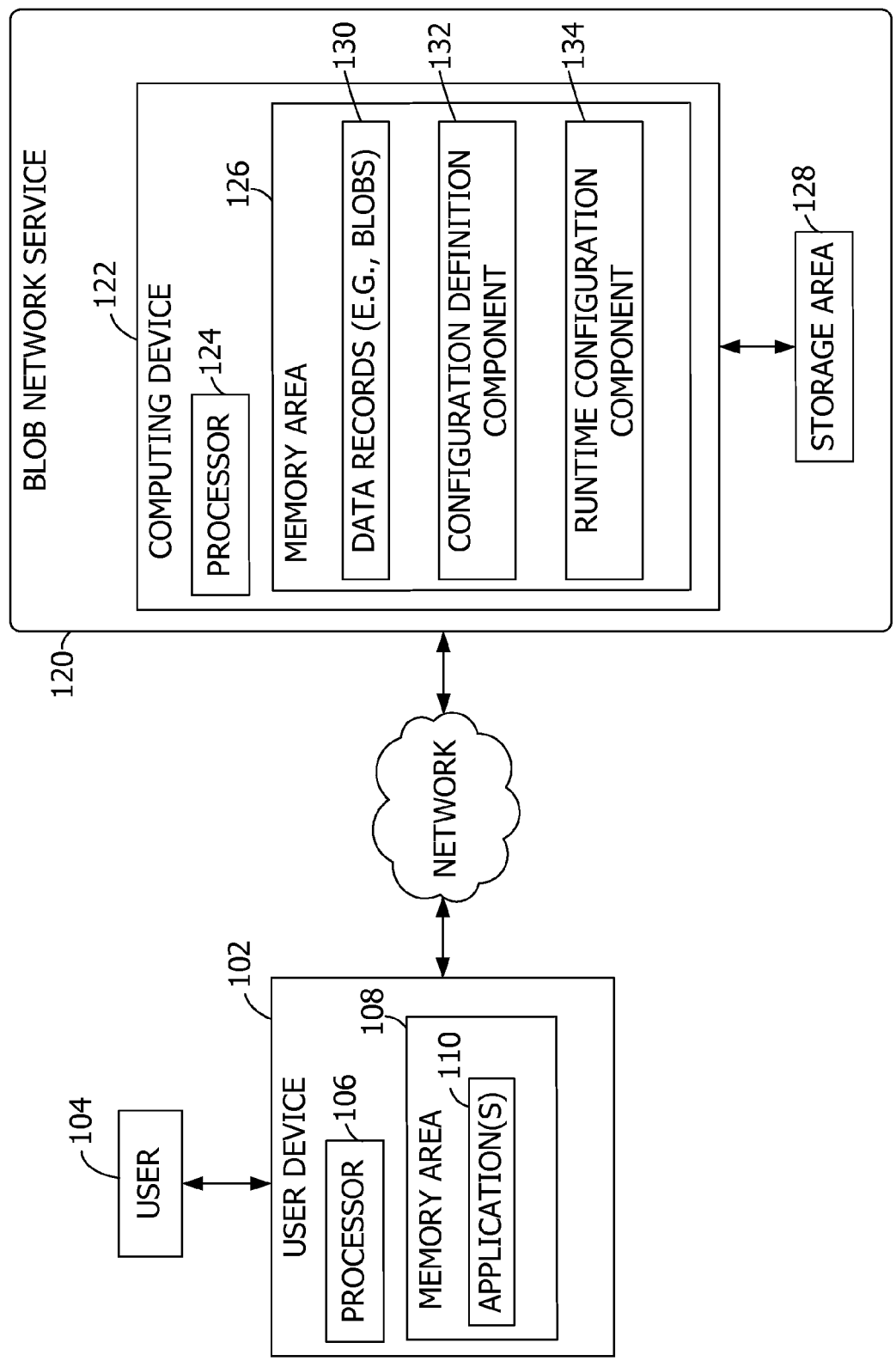
FIG. 1 is an exemplary block diagram illustrating a user device interacting with a blob network service.

Referring to the figures, embodiments of the disclosure enable dynamic, rule-based application configuration. Configuration data used by a client may be updated without creating and distributing updates to client application code. In some embodiments, a binary large object (blob) network service 120 allows a game title, or other application 110, to control sending different values to a caller (e.g., client) based on one or more predetermined factors or criteria. For example, the game title dynamically presents a user 104 with different information based on the user's locale and/or language, or randomly. This enables the game title to preconfigure an experience that is then crafted to the user 104 based on criteria.

In exemplary embodiments, the blob network service 120 manipulates blobs referred to as configuration blobs. The blob network service 120 makes configuration decisions on behalf of an application 110 (e.g., a game title) using the configuration blob without the application 110 itself requiring any knowledge of the universe of possible configuration options, or the situations under which the various configuration options may be needed. As such, application developers and publishers may experiment with different configurations without making changes to the application 110 itself. This provides cost savings and reduced update turnaround times for applications 110, such as those that run in environments where any changes to the applications 110 are approved by a third party (e.g., game consoles).

The blob network service 120 may be a web server, cloud service, or any other network-enabled computing device 122 able to accept requests from one or more of the applications 110. To the application 110, configuration blobs manifest themselves as a stream of data in a format that is known to the application 110. This may be a standard format such as extensible markup language (XML) and/or JAVASCRIPT object notation (JSON), but the format may be any format including a binary format known only to the application 110 and the developer of that application 110.

In exemplary embodiments, applications 110 accept a specific configuration format, and the blob network service 120 is able to change the values in the configuration data based on information about the user 104, device, and/or platform that is making the request. The blob network service 120 also has knowledge of the format and is able to produce customized configuration data in real-time on a request-by-request basis.

While described with reference to game titles in some embodiments, aspects of the disclosure are operable with any form, type, or quantity of applications 110.

Referring to FIG. 1, an exemplary block diagram illustrates the user device 102, such as a gaming console, associated with the user 104. The user device 102 represents any device executing instructions (e.g., as application programs, operating system functionality, or both) to implement the operations and functionality associated with the user device 102. The user device 102 may include a mobile computing device or any other portable device. In some embodiments, the mobile computing device includes a gaming console or gaming device, mobile telephone, laptop, tablet, computing pad, netbook, and/or portable media player. The user device 102 may also include less portable devices such as desktop personal computers, kiosks, and tabletop devices. Additionally, the user device 102 may represent a group of processing units or other computing devices. For example, the user device 102 may be another service (e.g., sending requests).

The user device 102 has at least one processor 106 and a memory area 108. The user device 102 may also include at least one user interface. The processor 106 includes any quantity of processing units, and is programmed to execute computer-executable instructions for implementing aspects of the disclosure. The instructions may be performed by the processor 106 or by multiple processors executing within the user device 102, or performed by a processor external to the user device 102. In some embodiments, the processor 106 is programmed to execute instructions such as those illustrated in the figures.

The user device 102 further has one or more computer readable media such as the memory area 108. The memory area 108 includes any quantity of media associated with or accessible by the user device 102. The memory area 108 may be internal to the user device 102 (as shown in FIG. 1), external to the user device 102 (not shown), or both (not shown).

The memory area 108 stores, among other data, one or more applications 110. The applications 110, when executed by the processor 106, operate to perform functionality on the user device 102. Exemplary applications 110 include game titles, mail application programs, web browsers, calendar application programs, address book application programs, messaging programs, media applications, location-based services, search programs, and the like. The applications 110 may communicate with counterpart applications or services such as web services accessible via a network. For example, the applications 110 may represent downloaded client-side applications that correspond to server-side services executing in a cloud.

The user device 102 may include a graphics card for displaying data to the user 104 and receiving data from the user 104, along with computer-executable instructions (e.g., a driver) for operating the graphics card. Further, the user device 102 may include a display (e.g., a touch screen display or natural user interface) and/or computer-executable instructions (e.g., a driver) for operating the display. The user device 102 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the user device 102 in a particular way.

In some embodiments, the user device 102 includes a communications interface such as a network interface card and/or computer-executable instructions (e.g., a driver) for operating the network interface card. Communication between the user device 102 and other devices may occur using any protocol or mechanism over any wired or wireless connection. In some embodiments, the communications interface is operable with near-field communication (NFC) tags.

In exemplary embodiments, the user device 102 communicates with the blob network service 120, which provides data storage and retrieval services. The user device 102 and/or an application 110 executed by the user device 102 may be referred to as a client of the blob network service 120.

The blob network service 120 includes one or more computing devices 122. The computing device 122 represents any device executing instructions (e.g., as application programs, operating system functionality, or both) to implement the operations and functionality described herein. Additionally, the computing device 122 may represent a group of processing units or other computing devices The computing device 122 has at least one processor 124 and a memory area 126. The processor 124 includes any quantity of processing units, and is programmed to execute computer-executable instructions for implementing aspects of the disclosure. The instructions may be performed by the processor 124 or by multiple processors executing within the computing device 122, or performed by a processor external to the computing device 122. In some embodiments, the processor 124 is programmed to execute instructions such as those illustrated in the figures (e.g., FIG. 2).

The computing device 122 further has one or more computer-readable media such as the memory area 126. The memory area 126 includes any quantity of media associated with or accessible by the computing device 122. The memory area 126 may be internal to the computing device 122 (as shown in FIG. 1), external to the computing device 122 (shown by storage area 128), or both.

The memory area 126 stores one or more data records 130. While described as "records," the data records 130 represent any data stored in any format, configuration, structure, organization, or type. For example, the data records 130 may include one or more of the following: blob data, configuration parameters, configuration rules, available configuration values, text data, spreadsheet data, images, audio, video, and/or database data. The data records 130 may be stored in the memory area 126 as shown in FIG. 1 and/or stored in the storage area 128 external to the computing device 122. In some embodiments, a data record 130 has one or more fields associated therewith. Each field corresponds to a particular element or item of data.

The memory area 126 further stores one or more computer-executable components. Exemplary components include a configuration definition component 132 and a runtime configuration component 134. The components, when executed by the processor 124, enable access to data managed by the computing device 122, as further described with reference to FIG. 2 below.

At least a portion of the functionality of the various elements in FIG. 1 may be performed by other elements in the figures, or an entity (e.g., processor, web service, server, application program, computing device, etc.) not shown in FIG. 1.

In some embodiments, processor 106 and/or processor 124 represent an implementation of analog techniques to perform the operations described herein. For example, the operations may be performed by an analog computing device and/or a digital computing device. In some embodiments, the memory area 108 and/or the memory area 126 includes read-only memory and/or memory wired into an analog computing device.

The operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

Figure 2:
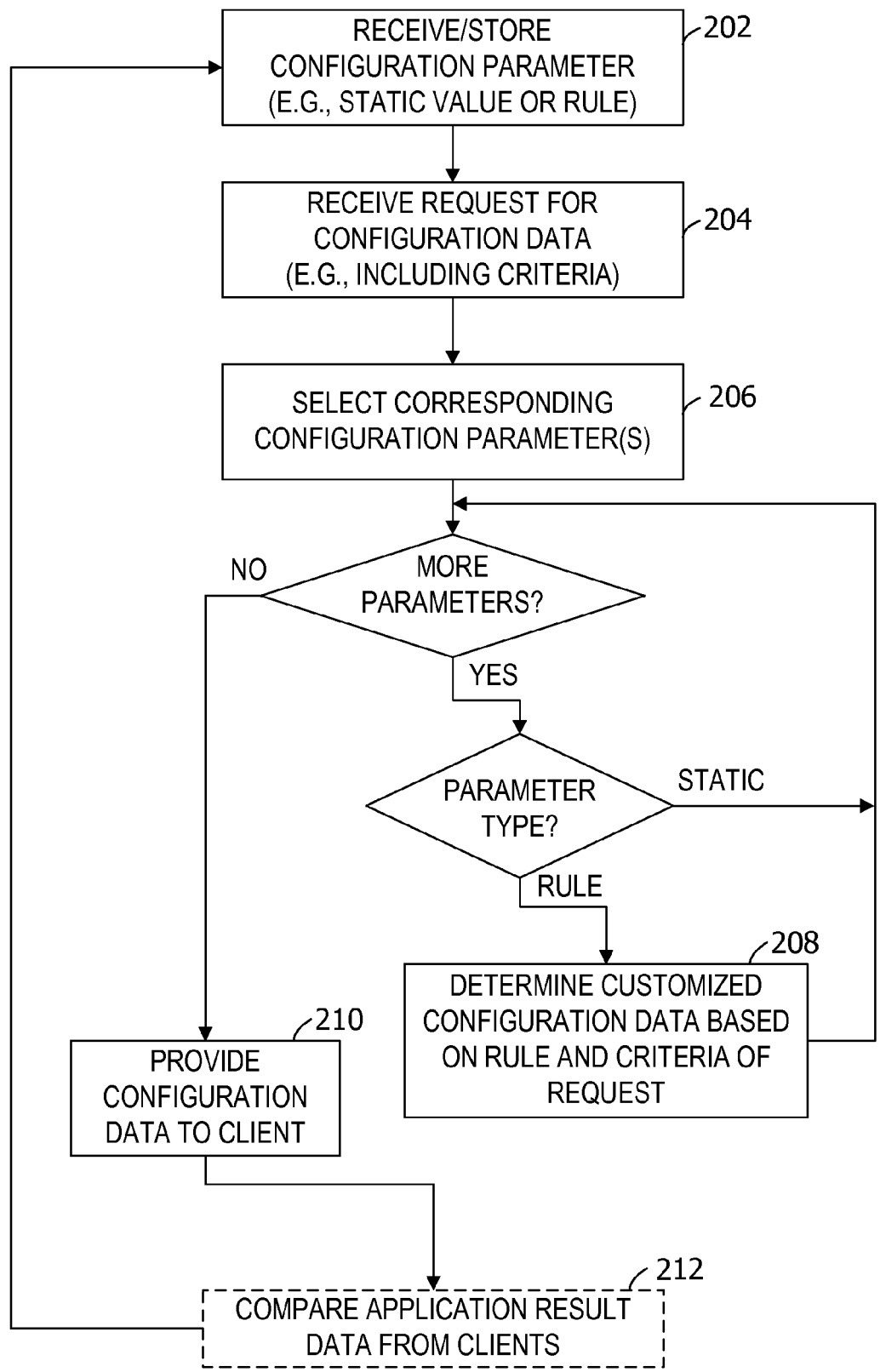
FIG. 2 is an exemplary flow chart illustrating operation of the computing device to provide configuration data to a client.

Referring next to FIG. 2, an exemplary flow chart illustrates operation of the computing device 122 to provide configuration data to a client, such as the user device 102. While the operations illustrated and/or described with reference to FIG. 2 are described as being performed by the blob network service 120 in some embodiments, the operations may be performed by any entity. For example, one or more of the operations may be performed by an entity in communication with both the user device 102 and the memory area 126 (and/or storage area 128), yet located remote from both the user device 102 and the memory area 126 (and/or storage area 128).

At 202, one or more configuration parameters are received from a developer (e.g., author, publisher, and/or administrator) of an application 110 used by a plurality of users 104. Each configuration parameter includes static configuration data or a rule that specifies configuration data based on one or more criteria. The configuration parameters are stored in the memory area 126 (e.g., as blobs in the data records 130).

A rule may specify configuration data based on (e.g., as a function of) an identifier (e.g., a numeric identifier) of the user 104, a name of the user 104, an age of the user 104, an experience level of the user 104, a set of applications 110 used by the user 104, a language associated with the user 104, a locale associated with the user 104, and/or an application title (e.g., a game title).

In some embodiments, each of a plurality configuration values is specified for a portion (e.g., 20%, 50%) of the users 104 of the application 110. For example, a rule may select a configuration value from a plurality of available configuration values. Each available configuration value corresponds to a portion of the users 104. Such a rule may select from the available configuration values based on an identifier of the user 104, a game title provided by the client, and/or any of the criteria described.

At 204, the computing device 122 receives a request for configuration data from a client executing the application 110. The request includes one or more criteria describing the user 104 associated with the client. For example, the criteria may include an identifier of the user 104, a name of the user 104, an age of the user 104, an experience level of the user 104, a set of applications 110 used by the user 104, a language associated with the user 104, a locale associated with the user 104, and/or an application title (e.g., a game title).

At 206, the computing device 122 selects one or more configuration parameters corresponding to the requested configuration data from the memory area 126. At 208, for each configuration parameter that includes a rule, the computing device 122 determines customized configuration data based on the rule and the criteria of the request. In exemplary embodiments, the rule is executed with the criteria as input.

The output of the rule is configuration data customized for the requesting client. Such configuration data includes graphical data to be displayed by the client, text to be displayed by the client, audio to be played by the client, a characteristic of a game character associated with (e.g., operated by) the client, a characteristic of an opponent, a quantity of opponents, a reward for completion of a task within the application 110, and/or any other configurable element associated with the application 110. Characteristics of game characters and/or opponents may include, for example, difficulty level, defensive strength, offensive strength, difficulty, and/or aggression.

At 210, when the configuration parameters selected at 206 are processed, the computing device 122 provides the configuration data to the client that executes the application 110 based on the provided configuration data. In some embodiments, customized configuration data is provided to the client without indicating to the client that the customized configuration data has been determined based on the provided criteria. For example, static configuration data may be indistinguishable from customized configuration data. In other embodiments, the computing device 122 includes an indication of how customized configuration data was determined (e.g., a rule identifier). This indication may be used for comparing the results of different customized configuration data.

Because each client specifies criteria specific to a corresponding user 104, in some embodiments, the computing device 122 may provide different configuration data to different clients that are executing the same application 110. As an example, a first client requests configuration data, specifying first criteria describing a first user associated with the first client. A second client also requests configuration data, specifying second criteria describing a second user associated with the second client. At 208, based on the same rule, the computing device 122 determines first customized configuration data using the first criteria and determines second customized configuration data using the second criteria. The first customized configuration data is provided to the first client, and the second customized configuration data is provided to the second client. In this example, the first customized configuration data is different from the second customized configuration data.

In some embodiments, multiple clients execute the application 110 based on customized configuration data and user input to create application result data. For example, the user 104 may battle an opponent with a difficulty level that is determined based on a rule. Game progress data such as the outcome of the battle (e.g., victory, defeat, or draw) and/or details such as duration of battle and blows struck by each combatant may be considered application result data. At 212, the application result data from a plurality of clients may be compared. For example, the computing device 122 may create and provide to the application developer a report indicating the frequency of each outcome based on each selected difficulty level.

Based on such a comparison, the application developer may modify one or more configuration parameters, in which case new configuration parameters are received at 202. For example, the configuration parameter may be modified by defining the configuration parameter as static configuration data, such as one of the configuration data items previously provided to a client based on a rule. The static value is subsequently provided to each client requesting configuration data. In general, the application developer updates one or more of the configuration parameters as described below with reference to FIG. 3.

In operation, the configuration definition component 132, when executed, causes the processor 124 to store a configuration parameter received from the application developer. The configuration parameter includes a rule that selects a configuration value from a plurality of available configuration values. Each available configuration value corresponds to at least a portion of the users 104. The runtime configuration component 134, when executed, causes the processor 124 to receive a request for configuration data corresponding to the configuration parameter from a client executing the application 110. The request includes one or more criteria describing the user 104 associated with the client. The runtime configuration component 134 further determines customized configuration data based on the rule and the criteria of the request. The customized configuration data includes a configuration value selected from the available configuration values. The runtime configuration component 134 provides the customized configuration data to the client. The client executes the application 110 based on the customized configuration data.

Figure 3:
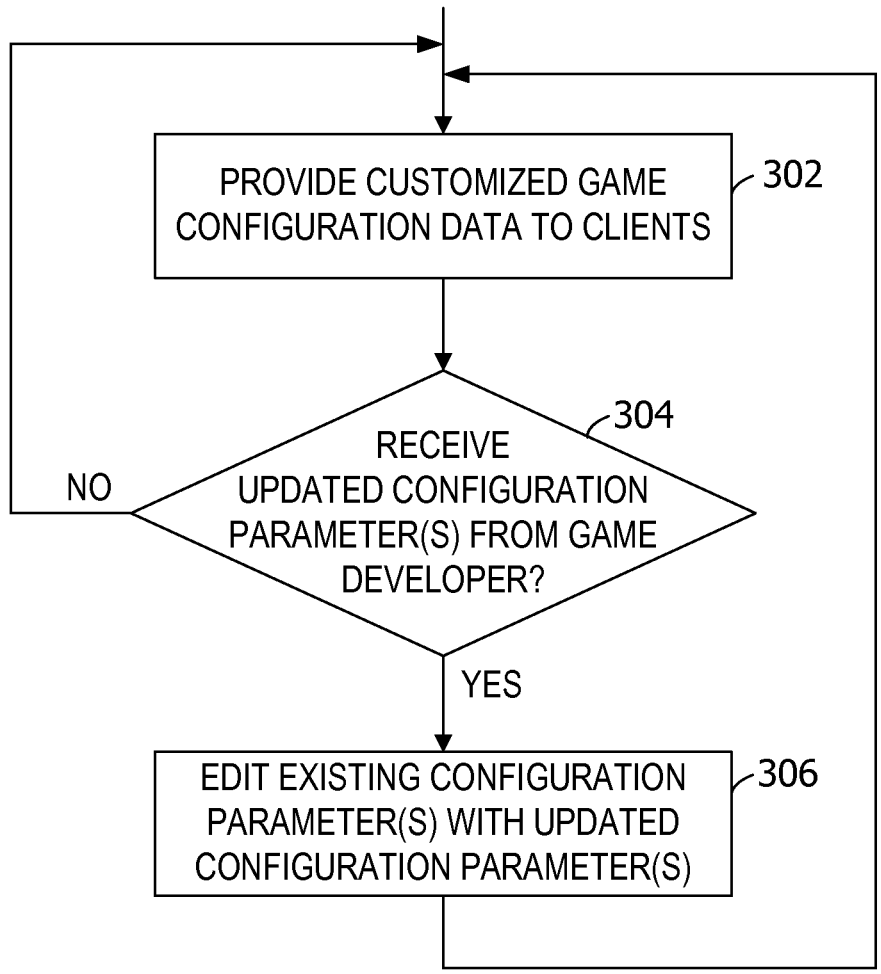
FIG. 3 is an exemplary flow chart illustrating operation of a cloud service to receive and update game configuration parameters from a game developer.

Referring next to FIG. 3, an exemplary flow chart illustrates operation of a cloud service, such as the blob network service, to receive and update game configuration parameters from a game developer. At 302, the blob network service provides game configuration data to clients, such as described with reference to FIG. 2. A game developer may, however, provide one or more updated configuration parameters at 304. If so, the blob network service edits the corresponding existing configuration parameters to reflect the received, updated configuration parameters at 306. Going forward, the blob network service then continues to provide game configuration to clients, but using the edited configuration parameters received from the game developer.

In an example, aspects of the disclosure support A/B testing. A/B testing allows the application developer to present different options to the callers (e.g., clients) for later analysis of the user experience and other use scenarios. For example, the application developer creates a role-playing game. The game includes fighting monsters that inhabit dungeons spread throughout the game. The number of monsters and the difficulty level of those monsters are stored in the game's configuration blob. The configuration blob is loaded from a network server each time the game is started. The game ships to the public on a DVD-ROM disc and, as such, may not easily be changed after it has shipped.

The game records application result data, such as statistics on how much time each user 104 spends playing the game and the number of dungeons that the user 104 has cleared. Those statistics are automatically sent to the computing device 122 by each client for use by the developer to review the statistics. As an example, the developer may discover that users 104 are unhappy with one of the dungeons and stop playing the game when this dungeon has been reached. Reviews for the game are negative, and sales for the game are declining. To improve the experience surrounding the dungeon that users 104 are unhappy with, the developer wants to make the monsters easier to fight thus making the dungeon more fun, but the developer does not want to make the monsters so easy that users 104 feel unchallenged. In this example, the developer may not know what number of monsters will achieve this goal.

Configuration blobs provide a way for the developer in this example to test different numbers of monsters without changing the software code of the game. Instead, the developer modifies the configuration blob to change the number of monsters in the dungeon from a static number (e.g., 100) into a rule referred to as a virtual node. The virtual node contains five source nodes, each with a different number of monsters (e.g., 20, 40, 60, 80, and 100). In this example, 20% of the users 104 will receive the "20" value, 20% will receive the "40" value, 20% will receive the "60" value, etc.

The developer submits the new/updated configuration blob to the blob network service 120. Because the game title requests the configuration blob service when the game title is started, the new settings immediately take effect upon execution of the game title. Users 104 are randomly assigned one of the five new values from the virtual node.

As each value is returned to the game, the configuration blob includes an extra value that indicates how the selection was made. In this example, the game title was already recording this data and including it in the statistics that are sent to the developer. Based on this information, the developer compares the value returned (e.g., in the range 20-100) to the amount of time that the user 104 spent playing the game. As an example, the developer may discover that the users 104 that received the "80" value played the game for twice as much time as the users 104 that received the other values.

In response, the developer modifies the configuration blob again to remove the virtual node and replace it with a static value of "80". Going forward, 100% of the users 104 receive the "80" value for that dungeon. The users 104 notice the change, are no longer unhappy with the dungeon, and begin positively reviewing the game title once again.

Another example contemplates improved gameplay for players of mixed levels. In this example, the application developer creates a co-operative multiplayer game. There are multiple maps in the game and players work together to defeat the enemies on the map. The starting characteristics of the players (e.g., shield strength, number of bullets, etc.) are stored in a configuration blob for each map. The configuration blob for each map is loaded from a network server each time the game is about to begin. When the game loads the map, the game uses a "customSelector" feature of virtual nodes to tell the service the level of the current player as well as the levels of the other players.

Continuing the example, the game records statistics on how often the players start the game on a map and then abort the game before defeating all of the enemies. Those statistics are automatically sent to a server for use by the application developer to review the statistics. The application developer discovers that users 104 are consistently exiting the game on a specific map soon after the game begins if one of the players has a much lower level than the other players. The application developer believes that the map is probably too difficult for players of different skill levels and so the high-level players will refuse to play with a low-level player.

In this example, the application developer wants to find a way to make the experience rewarding for each of the players. The developer decides to use a "customSelector" feature of a configuration blob to modify the starting characteristics for low-level players. Players at different skill levels are assigned different starting characteristics based on the different skill levels. For example, players that are level 10 or below receive 500% more starting shields than normal players, players that are between levels 10 and 20 receive 250% more starting shields, and players that are between levels 20 and 30 receive 100% more starting shields. This makes low-level players more difficult to kill and ensures that they are able to contribute to the co-operative game play, even at their lower skill level.

In this scenario, the configuration blob enables the dynamically adjustment of at least one aspect of the gameplay without having to change the game itself. In this case, the game provided information about the player (e.g., the player's level) to the service when requesting the configuration blob. The virtual nodes feature of the configuration blob makes it possible for the application developer to return different shield values to different player based on the level of each player. With existing systems, a change to the software code for the game would have been needed, thus incurring development time and cost. Furthermore, if the initial change was incorrect, additional development time and cost would have been needed to try out subsequent changes. In contrast, with configuration blobs, developers can make changes quickly and at reduced or minimal cost.

Another example contemplates locale-based configuration that allows the publisher to present localized experiences to the caller such as mature graphics, localized strings and voice, etc.

Additional Examples

The following is an exemplary configuration blob for a blackjack game.

```
{
  "defaultCardDesign":
  {
    "_virtualNode":
    {
      "_selectBy":"custom:gameMode",
      "_sourceNodes":
      [
        {"_selector":"silly", "_data":"RobotUnicornCard.png,binary"},
        {"_selector":"serious", "_data":"SeriousCard.png,binary"},
        {"_selector":"default", "_data":"StandardCard.png,binary"}
      ]
    }
  },
  "backgroundColor":"green",
  "dealerHitsOnSoft17":true
}
```

Requests for the exemplary configuration blob shown above (e.g., stored as . . . /data/settings,config) behaves as follows, depending on the query parameters.

The request "GET . . . /data/settings,config" returns "StandardCard.png,binary" because no custom query parameter was provided. The request "GET . . . /data/settings,config?customSelector=gameMode.silly" returns "RobotUnicornCard.png,binary". The request "GET . . . /data/settings,config?customSelector=gameMode.serious" returns "SeriousCard.png,binary". The request "GET . . . /data/settings,config?icustomSelector=gameMode.reallySilly" returns "StandardCard.png,binary" because "reallySilly" does not match a selector and so the default selector is used.

An additional example of a configuration blob for a computerized blackjack game is described in Appendix A.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user 104 in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

Embodiments have been described with reference to data monitored and/or collected from users 104. In some embodiments, notice may be provided to the users 104 of the collection of the data (e.g., via a dialog box or preference setting) and users 104 are given the opportunity to give or deny consent for the monitoring and/or collection. The consent may take the form of opt-in consent or opt-out consent.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Listed below is an exemplary configuration of a configuration blob that, in some embodiments, stores game configuration data for a blackjack game.

The developer stores the following exemplary object at . . . /data/settings,config (in global data):

```
{
    "defaultCardDesign":"StandardCard.png,binary",
    "backgroundColor":"green",
    "dealerHitsOnSoft17":true
}
```

Later, the developer decides to add virtual node support to the configuration blob. In this scenario, the developer wants to determine if the new "RobotUnicornCard" is more appealing to users 104 than the StandardCard. The settings,config object is updated as follows:

```
{
  "defaultCardDesign":
  {
    "_virtualNode":
    {
      "_selectBy":"randomUser",
      "_sourceNodes":
      [
        {"_selector":"20", "_data":"RobotUnicornCard.png,binary"},
        {"_selector":"default", "_data":"StandardCard.png,binary"}
      ]
    }
  },
  "backgroundColor":"green",
  "dealerHitsOnSoft17":true
}
```

80% of the game's users 104 will continue to receive the original contents of the configuration blob, with the addition of a _sourceNodes property as shown below:

```
{
    "defaultCardDesign":"StandardCard.png,binary",
    "backgroundColor":"green",
    "dealerHitsOnSoft17":true,
    "_sourceNodes":["defaultCardDesign:randomUser:default"]
}
```

The _sourceNodes property lists the complete path to the property was replaced, the _selectBy method that was used to choose the data that was returned to the caller, and the _selector value that was chosen by the service. Multiple entries may appear in the _sourceNodes list, one for each of the replacements that was made.

20% of the game's users 104 will receive the RobotUnicornCard as shown below:

```
{
    "defaultCardDesign":"RobotUnicornCard.png,binary",
    "backgroundColor":"green",
    "dealerHitsOnSoft17":true,
    "_sourceNodes":["defaultCardDesign:randomUser:20"]
}
```

What is claimed is:

1. A system for manipulating binary objects, said system comprising:
a memory area storing a configuration parameter associated with an application that is executed by a first client and by a second client, the configuration parameter including a rule that specifies configuration data based on one or more criteria; and
a processor programmed to:
receive a request for configuration data corresponding to the configuration parameter from the first client, the request including one or more criteria describing a user associated with the first client;
determine customized configuration data based on the rule and the criteria of the request;
provide the customized configuration data to the first client, wherein the first client executes the application based on the customized configuration data and input from the user to create first application result data; and
compare the first application result data to second application result data created by the second client, wherein the configuration parameter is modified based on the comparison.

2. The system of claim 1, wherein the customized configuration data is first customized configuration data associated with a first user, and the processor is further programmed to:
determine second customized configuration data based on the rule and one or more criteria describing a second user associated with the second client; and
provide the second customized configuration data to the second client, wherein the second client executes the application based on the second customized configuration data and input from the second user to create the second application result data.

3. The system of claim 1, wherein the processor is further programmed to compare the first application result data to the second application result data at least in part by comparing game progress data associated with the first user to game progress data associated with the second user.

4. The system of claim 1, wherein the processor is further programmed to modify the configuration parameter by defining the configuration parameter as one of the following: the first customized configuration data, and the second customized configuration data, wherein the modified configuration parameter is subsequently provided to the first client and the second client.

5. The system of claim 1, wherein the processor is further programmed to modify the configuration parameter by defining the configuration parameter as a static value, wherein the modified configuration parameter is subsequently provided to the first client and the second client.

6. The system of claim 1, wherein the processor is further programmed to provide to the first client an indication that the customized configuration data has been determined based on the criteria.

7. The system of claim 1, wherein the processor is further programmed to determine the customized configuration data based on criteria including one or more of the following: an identifier of the user, a name of the user, an age of the user, an experience level of the user, a language associated with the user, and a locale associated with the user.

8. A method comprising:
receiving a first request for configuration data from a first client executing an application, the first request including one or more criteria describing a first user associated with the first client;
selecting a configuration parameter corresponding to the requested configuration data from a memory area, wherein the configuration parameter includes a rule that specifies the configuration data based on one or more criteria;
determining first customized configuration data based on the rule and the one or more criteria of the first request;
providing the first customized configuration data to the first client, wherein the first client executes the application based on the first customized configuration data;
receiving a second request for configuration data from a second client executing the application, the second request including one or more criteria describing a second user associated with the second client;

determining second customized configuration data based on the rule and the one or more criteria of the second request; and providing the second customized configuration data to the second client, wherein the second client executes the application based on the second customized configuration data, wherein the first client and the second client execute the same application.

9. The method of claim 8, wherein the first customized configuration data is determined based on criteria including one or more of the following: an identifier of the first user, and a name of the first user.

10. The method of claim 8, wherein the first customized configuration data is determined based on criteria including an age of the first user.

11. The method of claim 8, wherein the first customized configuration data is determined based on criteria including one or more of the following: an experience level of the first user, and a set of applications used by the first user.

12. The method of claim 8, wherein the first customized configuration data is determined based on criteria including one or more of the following: a language associated with the first user, and a locale associated with the first user.

13. The method of claim 8, wherein determining the first customized configuration data comprises determining graphical data to be displayed by the first client.

14. The method of claim 8, further comprising modifying the configuration parameter by defining the configuration parameter as a static value, wherein the modified configuration parameter is subsequently provided to the first client and the second client.

15. One or more computer storage media embodying computer-executable components, said components comprising:

a configuration definition component that upon execution causes at least one processor to store a configuration parameter received from a developer of an application used by a plurality of users, the configuration parameter including a rule that selects a configuration value from available configuration values, the available configuration values corresponding to a portion of the plurality of users; and a runtime configuration component that upon execution causes at least one processor to:

receive a request for configuration data corresponding to the configuration parameter from a client executing the application, the request including one or more criteria describing a user associated with the client;

determine customized configuration data based on the rule and the criteria of the request, the customized configuration data including a configuration value selected from the available configuration values; and provide the customized configuration data to the client, wherein the client executes the application based on the customized configuration data.

16. The computer storage media of claim 15, wherein the runtime configuration component further causes the processor to determine the customized configuration data at least in part by selecting a configuration value from the available configuration values based on an identifier of the user.

17. The computer storage media of claim 15, wherein the runtime configuration component further causes the processor to determine the customized configuration data at least in part by selecting a configuration value from the available configuration values based on a game title provided by the client.

18. The computer storage media of claim 15, wherein the runtime configuration component further causes the processor to determine the customized configuration data at least in part by selecting graphical data to be displayed by the first client.

19. The computer storage media of claim 15, wherein the runtime configuration component further causes the processor to determine the customized configuration data at least in part by selecting a characteristic of a game character associated with the client.

20. The computer storage media of claim 15, wherein the runtime configuration component further causes the processor to determine the customized configuration data at least in part by selecting one or more of the following: a characteristic of an opponent, and a quantity of opponents.

* * * * *